US008306980B2

(12) United States Patent
Abbondanzio et al.

(10) Patent No.: US 8,306,980 B2
(45) Date of Patent: Nov. 6, 2012

(54) FLEXIBLE AND EXTENSIBLE FRAMEWORK AND MODEL FOR SYSTEMS MANAGEABLE COMPONENTS

(75) Inventors: Antonio Abbondanzio, Raleigh, NC (US); Thomas J. Prorock, Raleigh, NC (US); Robert E. Warren, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 12/420,915

(22) Filed: Apr. 9, 2009

(65) Prior Publication Data

US 2010/0262626 A1    Oct. 14, 2010

(51) Int. Cl.
*G06F 17/30* (2006.01)
(52) U.S. Cl. .................................................. 707/736
(58) Field of Classification Search .................. None
See application file for complete search history.

(56) References Cited

U.S. PATENT DOCUMENTS

| | | | |
|---|---|---|---|
| 6,134,559 A * | 10/2000 | Brumme et al. | 707/999.103 |
| 7,305,485 B2 | 12/2007 | Chang et al. | |
| 2002/0184401 A1 * | 12/2002 | Kadel et al. | 709/315 |
| 2005/0097561 A1 * | 5/2005 | Schumacher et al. | 718/106 |
| 2005/0256825 A1 * | 11/2005 | Dettinger et al. | 707/1 |
| 2006/0200739 A1 * | 9/2006 | Bhatia et al. | 715/500 |

OTHER PUBLICATIONS

Bohdanowicz et al., The Problematic of Distributed Systems Supervision—An Example: Genesys., IFIP International Federation for Information Processing, 2004, pp. 115-150, vol. 157/2004, Springer Boston.

* cited by examiner

*Primary Examiner* — Yuk Ting Choi
(74) *Attorney, Agent, or Firm* — Yudell Isidore NG Russell PLLC

(57) ABSTRACT

A method, a system and a computer program product for defining manageable component objects to an application utilizing data roots. A manageable component engine creates a bridge manageable component model utilizing the data roots. Data roots, or root data, are retrieved and stored in a manageable component persistent index of an application. The manageable component persistent index is processed for one or more root objects during an initialization of a manageable component engine. The manageable component engine queries one or more data sources, and accesses data required for creating a manageable component object instance. One or more manageable component objects are registered in a manageable component repository. The manageable component bridge model is created and displayed via a graphical user interface.

6 Claims, 4 Drawing Sheets

FLEXIBLE AND EXTENSIBLE FRAMEWORK AND MODEL FOR SYSTEMS MANAGEABLE COMPONENTS

BACKGROUND

1. Technical Field

The present invention generally relates to manageable component objects and in particular to defining manageable component objects in a computer system.

2. Description of the Related Art

The computer industry utilizes a number of management products to manage and manipulate data sources. The management products such as Tivoli Provisioning Manager and Tivoli Intelligent Orchestrator retrieve present information from data sources to an end user. The retrieved information is presented as a complicated data browser in a confusing non-systematic view. Due to large volumes of data that may be collected by a user, current management systems are not capable of effectively presenting data.

SUMMARY OF ILLUSTRATIVE EMBODIMENTS

Disclosed are a method, a system and a computer program product for defining manageable component objects to an application utilizing data roots. A manageable component engine creates a bridge manageable component model utilizing the data roots. Data root, or root data, is retrieved and stored in a manageable component persistent index of an application. The manageable component persistent index is processed for one or more root objects during an initialization of a manageable component engine. The manageable component engine queries one or more data sources, and accesses data required for creating a manageable component object instance. One or more manageable component objects are registered in a manageable component repository. The manageable component bridge model is created and displayed via a graphical user interface.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
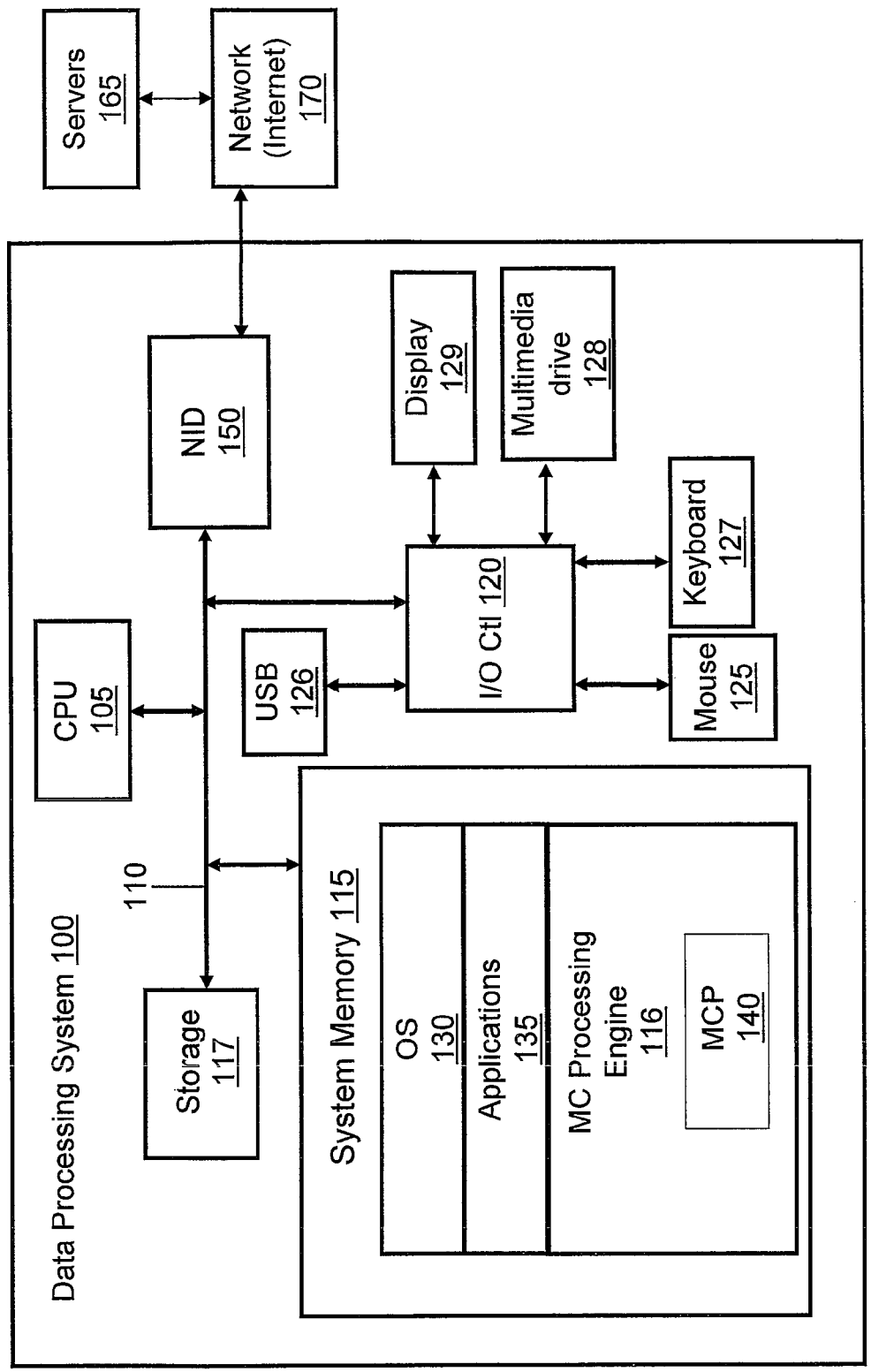
FIG. 1 is a block diagram of a data processing system according to one embodiment of the invention.

The illustrative embodiments provide a method, a system and a computer program product for defining manageable component objects to an application utilizing data roots. A manageable component engine creates a bridge manageable component model utilizing the data roots. Data roots, or root data, is retrieved and stored in a manageable component persistent index of an application. The manageable component persistent index is processed for one or more root objects during an initialization of a manageable component engine. The manageable component engine queries one or more data sources, and accesses data required for creating a manageable component object instance. One or more manageable component objects are registered in a manageable component repository. The manageable component bridge model is created and displayed via a graphical user interface.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the following terms are defined as follows: data root(s), also expressed as "root data", is described as raw data retrieved from one or more data sources.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) 105 connected to system memory 115 via system interconnect/bus 110. Also connected to system bus 110 is Input/output (I/O) controller 120, which provides connectivity and control for input devices, of which pointing device (or mouse) 125 and keyboard 127 are illustrated. I/O controller 120 also provides connectivity and control for output devices, of which display 129 is illustrated. Additionally, a multimedia drive 128 (e.g., compact disk read/write (CDRW) or digital video disk (DVD) drive) and USB (universal serial bus) port 126 are illustrated, coupled to I/O controller 120. Multimedia drive 128 and USB port 126 enable insertion of a removable storage device (e.g., optical disk or thumb drive) on which data/instructions/code may be stored and/or from which data/ instructions/code may be retrieved. DPS 100 also comprises storage 117, within which data/instructions/code may also be stored and/or retrieved.

DPS 100 is also illustrated with a network interface device (NID) 150, by which DPS 100 may connect to one or more external networks 170, of which the Internet is provided as one example. NID 150 may be configured to operate via wired and/or wireless connection to an access point of the network. Network 170 may be an external network such as the Internet or wide area network (WAN), or an internal network such as an Ethernet (local area network—LAN) or a Virtual Private Network (VPN). Connection to the external network 170 may be established with one or more servers 165, which may also provide data/instructions/code for execution on DPS 100, in one embodiment.

In addition to the above described hardware components of DPS 100, various features of the invention are completed/supported via software (or firmware) code or logic stored within system memory 115 or other storage (e.g., storage 117) and executed by CPU 105. Thus, for example, illustrated within system memory 115 are a number of software/firmware/logic components, including operating system (OS) 130 (e.g., Microsoft Windows®, a trademark of Microsoft Corp, or GNU®/Linux®, registered trademarks of the Free Software Foundation and The Linux Mark Institute), applications 135, manageable component processing (MCP) engine 116, and MCP utility 140 (which executes on CPU 105 to provide MCP logic). In actual implementation, MCP utility 140 may be combined with or incorporated within MCP engine 116 to provide a single executable component, collectively providing the various functions of each individual software component when the corresponding combined code is executed by the CPU 105. For simplicity, MCP utility 140 is illustrated and described as a stand alone or separate software/firmware component, which provides specific functions, as described below.

In one embodiment, servers 165 includes a software deploying server, and DPS 100 communicates with the software deploying server (165) via network (e.g., Internet 170) using network interface device 150. Then, the MCP utility 140 may be deployed from/on the network, via software deploying server 165. With this configuration, software deploying server performs all of the functions associated with the execution of MCP utility 140. Accordingly, DPS 100 is not required to utilize internal computing resources of DPS 100 to execute MCP utility 140.

CPU 105 executes MCP utility 140 as well as OS 130, which supports the graphical user interface features of MCP utility 140. Certain functions supported and/or implemented by MCP utility generate processing logic executed by processor and/or MCP engine 116 to complete the implementation of that function. For simplicity of the description, the collective body of code that enables these various features is referred to herein as MCP utility 140. Among the software code/instructions/logic provided by MCP utility 140, and which are specific to the invention, are: (a) code/logic for defining manageable component objects to an application using data roots; (b) code/logic for processing the manageable component persistent index for all root objects; (c) code/logic for registering the manageable component object in a manageable component object repository; and (d) code/logic for displaying the manageable component bridge model via a graphical user interface. According to the illustrative embodiment, when CPU 110 executes MCP utility 140, DPS 100 initiates a series of functional processes that enable the above functional features as well as additional features/functionality. These features/functionalities are described in greater detail below within the description of FIGS. 2-4.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LNUX operating system.

Figure 2:
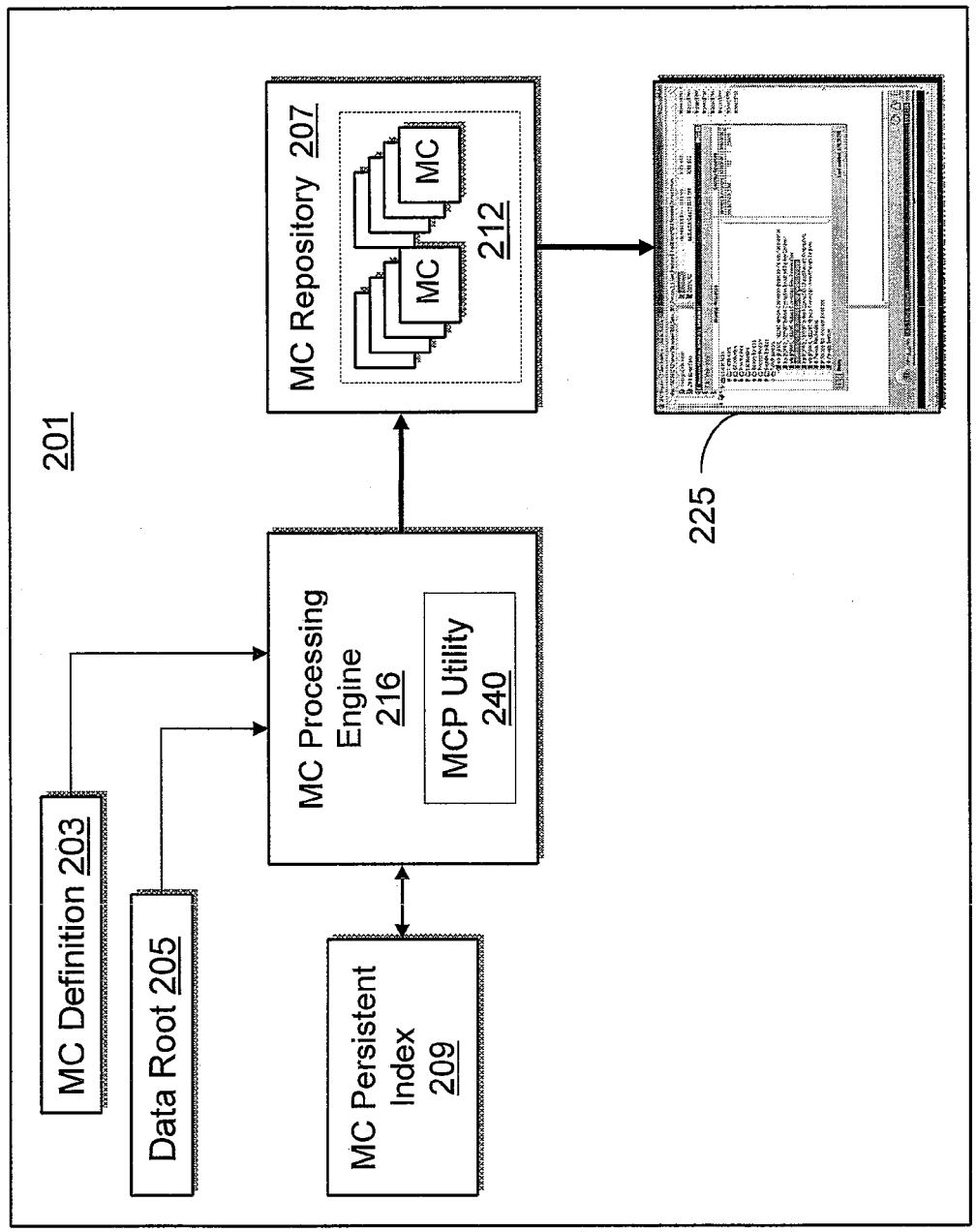
FIG. 2 is a schematic diagram illustrating elements utilized for displaying a manageable component bridge model via a graphical user interface in accordance with one embodiment of the invention.

With reference now to FIG. 2 which illustrates elements utilized for displaying a manageable component bridge model via a graphical user interface. Manageable component element system 201 comprises: data root 205, manageable component definition 203, manageable component persistent index 209, MCP processing engine 216, manageable component repository 207, and manageable component bridge model 225. Within MCP engine 216 is MCP utility 240. Manageable component repository 207 stores manageable component objects 212.

In one embodiment, manageable component objects are defined to an application, utilizing data roots. Data root 205 is received by MCP engine 216. Data root 205 contains the root level information required for querying data sources. The basis for manageable component objects 212 are data root 205. Data root 205 is imported to MCP engine 216 and/or retrieved by MCP engine 216. When MCP engine 216 receives data root 205, data root 205 is stored in manageable component persistent index 209. When a manageable component object of manageable component objects 212 is cleared from in-memory cache, manageable component persistent index 209 presents data root 205 to MCP engine 216 to reconstruct and/or refresh a manageable component object.

In one embodiment, manageable component persistent index is processed for all root objects upon restart of the MCP utility. On every restart of MCP utility 240, manageable component persistent index 209 is processed for all root data (data root 205). When manageable component persistent index 209 is processed, the manageable component bridge model 225 is dynamically reconstructed. MCP engine 216 retrieves the data root 205 and processes data root 205, via MCP utility 240, to create manageable component objects 212. One or more data sources are queried to access data needed to create manageable component bridge model 225. MCP engine 240 is capable of querying data sources including, but not limited to: databases, web-services, web-html-data, applications, remote computers. The data sources may have any array of communication protocols including, but not limited to: common information model (CIM), simple network management protocol (SNMP), secure shell (SSH), file transfer protocol (FTP), and telnet. Manageable component definition 203 retrieves data (data root 205) from one or more sources. When the manageable component engine has acquired all data for creating and/or reconstructing manageable component bridge model 225, the data is registered in manageable component repository 207, as manageable component objects 212.

Figure 3:
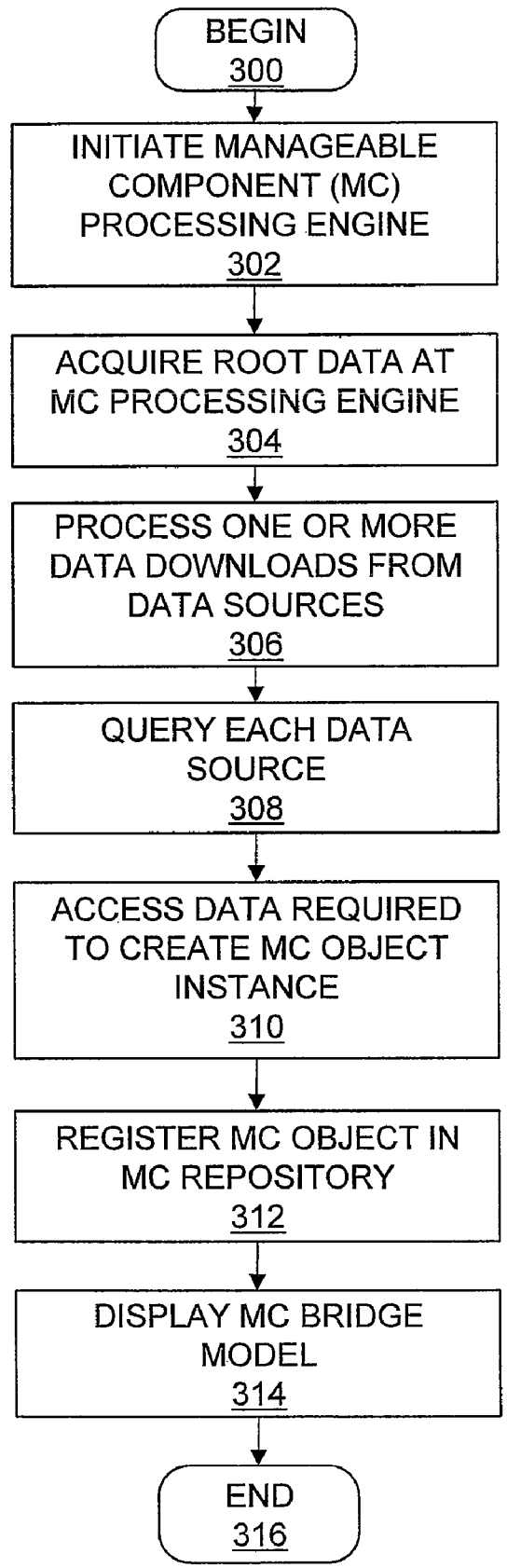
FIG. 3 is a logic flow chart for processing data sources via a manageable component processing engine according to one embodiment of the invention.
Figure 4:
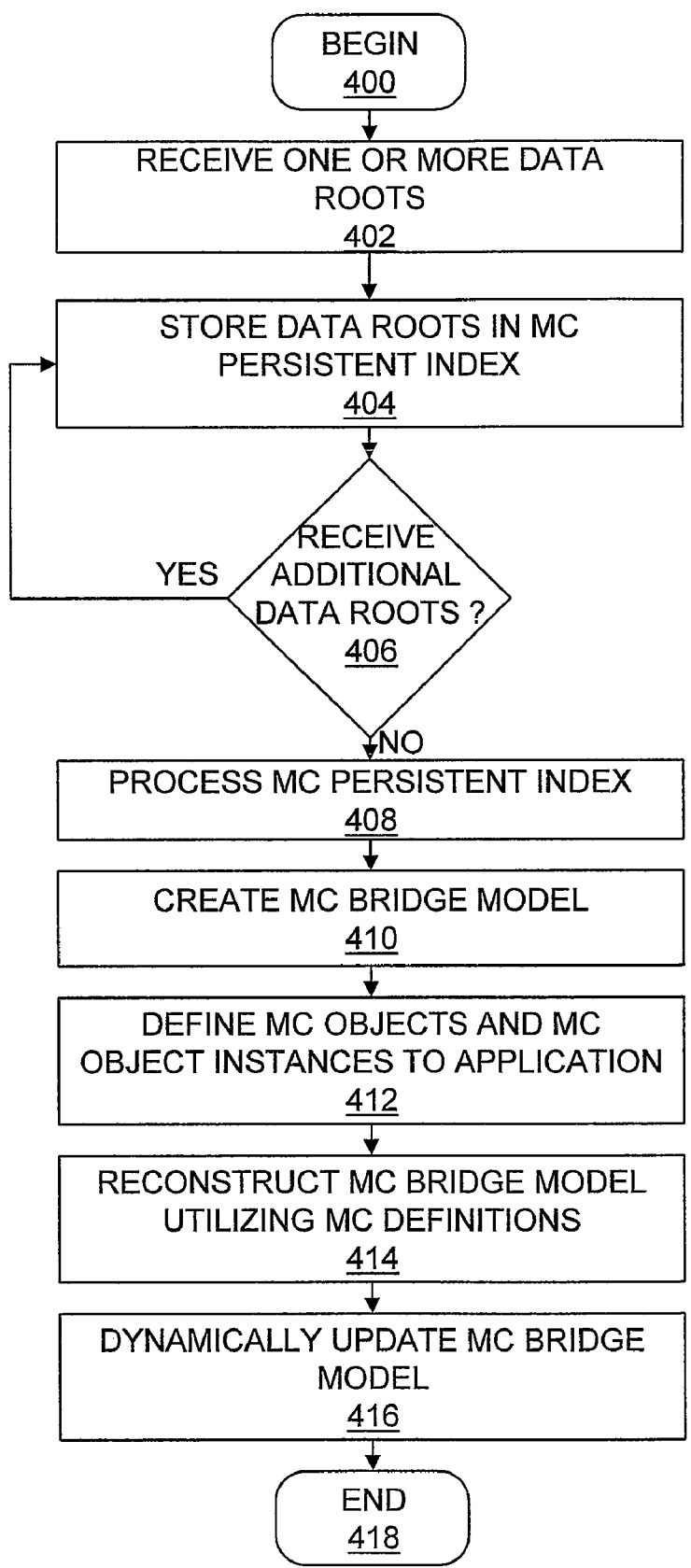
FIG. 4 is a logic flow chart for utilizing data roots to define manageable component objects in accordance with one embodiment of the invention.

FIGS. 3-4 are flow charts illustrating various methods by which the above processes of the illustrative embodiments are completed. Although the methods illustrated in FIGS. 3-4 may be described with reference to components shown in FIGS. 1-2, it should be understood that this is merely for convenience and alternative components and/or configurations thereof can be employed when implementing the various methods. Key portions of the methods may be completed by MCP utility 140, executing on processor 105 within DPS 100 (FIG. 1) and controlling specific operations of MCP engine 116, and the methods are thus described from the perspective of both MCP utility 140 and MCP engine 116.

The flow chart of FIG. 3 is the method for processing data sources via a manageable component processing engine. The process of FIG. 3 begins at initiator block 300 and proceeds to block 302, at which the MCP engine (116 of FIG. 1) is initiated. Root data is acquired by the MCP engine at block 304. At block 306 one or more data downloads from data sources (root data) are processed. Each data source is queried at block 308. At block 310 data required to create a manageable component object instance is accessed by MCP utility 140. The manageable component object is registered in the manageable component repository at block 312. At block 314 the manageable component bridge model, as defined by the manageable component object instance, is displayed. The process ends at block 316.

FIG. 4 is the method for utilizing data roots to define manageable component objects. The flow chart of FIG. 4 begins with block 400, and proceeds to block 402. At block 402 one or more data roots are received. The data roots are store in the manageable component persistent index at block 404. A decision is made at block 406 whether additional data roots are received by the manageable component processing engine. If additional data roots are received the process returns to block 404. If additional data roots are not received, the process continues to block 408. At block 408 the manageable component persistent index is processed for all root objects (root data). A manageable component bridge model is created at block 410. At block 412 manageable component objects and manageable component object instances are defined to an application utilizing data roots. The manageable component bridge model is reconstructed based on the manageable component definitions at block 414. As the manageable component objects are adjusted, at block 416, the manageable component bridge model is dynamically modified. The process ends at block 418.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiment, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for generating a manageable component bridge model, said method comprising:
 initializing, by a computer processor, a manageable component processing engine by:
  acquiring root data required to create a manageable component object of an application, wherein the root data comprises raw data retrieved from one or more data sources,
  storing the root data in a manageable component persistent index of the application,
  processing the root data in the manageable component persistent index to generate the manageable component object,
  constructing the manageable component bridge model based on the manageable component object,
  displaying the manageable component bridge model on a display device,
  determining that the manageable component object is adjusted, and
  in response to determining that the manageable component object is adjusted:
   processing the root data in the manageable component persistent index to generate a reconstructed manageable component object,
   dynamically reconstructing the manageable component bridge model based on the reconstructed manageable component object, and
   displaying the reconstructed bridge model.

2. The method of claim 1, further comprising registering the manageable component object in a manageable component object repository.

3. A system, comprising:
 a processor;
 a storage facility that stores manageable component objects;
 a memory having stored thereon a utility which, when executed by the processor:
 initializes a manageable component processing engine by causing the processor to:
  acquire root data required to create a manageable component object of an application, wherein the root data comprises raw data retrieved from one or more data sources,
  store the root data in a manageable component persistent index of the application,
  process the root data in the manageable component persistent index to generate a manageable component object,
  construct the manageable component bridge model based on the manageable component object,
  display the manageable component bridge model on a display device,
  determine that the manageable component object is adjusted, and
  in response to determining that the manageable component object is adjusted:
   process the root data in the manageable component persistent index to generate a reconstructed manageable component object,
   dynamically reconstruct the manageable component bridge model based on the reconstructed manageable component object, and
   display the reconstructed bridge model.

4. The system of claim 3, wherein the utility further registers the manageable component object in a manageable component object repository.

5. A computer program product comprising:
 a non-transitory machine-readable storage medium; and
 program code on the non-transitory machine-readable storage medium that when executed by a computer device causes the computer device to:
 initialize a manageable component processing engine by:
  acquiring root data required to create a manageable component object of an application, wherein the root data comprises raw data retrieved from one or more data sources,
  storing the root data in a manageable component persistent index of the application,
  processing the root data in the manageable component persistent index to generate a manageable component object,
  constructing the manageable component bridge model based on the manageable component object,
  displaying the manageable component bridge model on a display device,
  determining that the manageable component object is adjusted, and
  in response to determining that the manageable component object is adjusted:
   processing the root data in the manageable component persistent index to generate a reconstructed manageable component object,
   reconstructing the manageable component bridge model based on the dynamically reconstruct manageable component object, and display the reconstructed bridge model.

6. The computer program product of claim 5, wherein the program code further causes the computer device to register the manageable component object in a manageable component object repository.

* * * * *